No. 853,003. PATENTED MAY 7, 1907.
M. COLLINS.
PACKING.
APPLICATION FILED DEC. 21, 1906.

WITNESSES:
E. M. Ware
A. V. Groucks

INVENTOR
Michael Collins,
BY
Walter C. Pusey
ATTORNEY.

UNITED STATES PATENT OFFICE.

MICHAEL COLLINS, OF PHILADELPHIA, PENNSYLVANIA, ASSIGNOR OF ONE-HALF TO JAMES P. McCANN, OF PHILADELPHIA, PENNSYLVANIA.

PACKING.

No. 853,003.　　Specification of Letters Patent.　　Patented May 7, 1907.

Application filed December 21, 1906. Serial No. 348,867.

*To all whom it may concern:*

Be it known that I, MICHAEL COLLINS, a citizen of the United States, and a resident of Philadelphia, State of Pennsylvania, have invented certain new and useful Improvements in Packing, of which the following is a full, clear, and exact description, reference being had to the accompanying drawings, of which—

Figure 1:
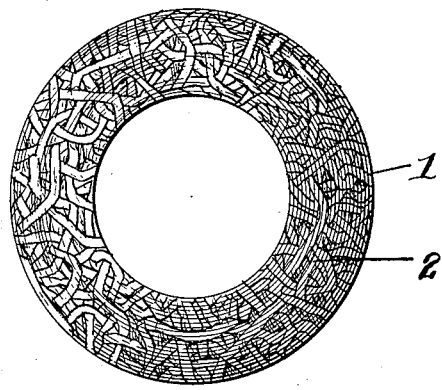
Figure 2:
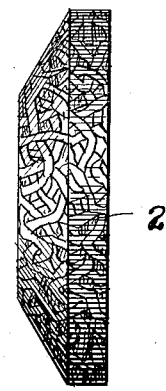
Figure 3:
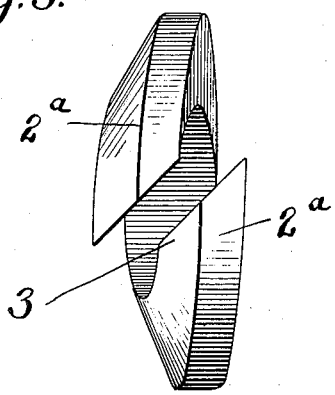
Figure 4:
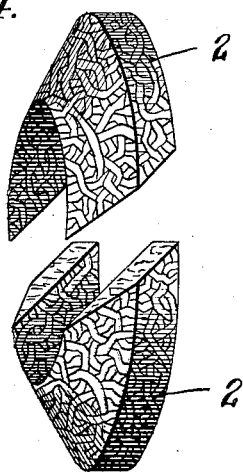
Figure 5:
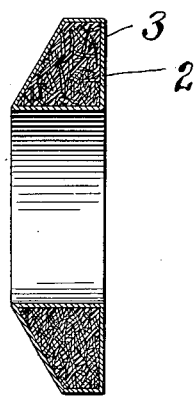
Figure 6:
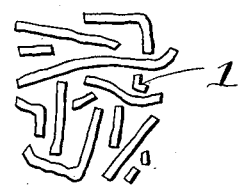

Figure 1 is an end elevation of a packing ring in which my invention is embodied. Fig. 2 is a side elevation. Fig. 3 is a perspective of a two-part ring embodying my invention. Fig. 4 is a side elevation of a split ring, the packing material being enveloped in an elastic coating to permit said split ring to be opened to slip over a rod. Fig. 5 is a vertical section of the construction shown in Fig. 4. Fig. 6 shows a number of the constituent particles of my metallic packing before the same have been felted together.

This invention relates to improvements in metallic gaskets or packing, and consists primarily in forming a gasket or packing by felting together under pressure a mass of shreds or shavings of soft metal alloy, suitable for making packings of this general class.

The invention further consists in coating said packing ring or gasket with an elastic coating, whereby said ring may be split and so put over a rod without fracturing the packing, and which elastic coating may be readily melted from the packing without injury thereto when the same is in place.

In the drawings, I have shown forms of gaskets or packing rings commonly used, and in which my invention is embodied, although of course I do not wish to be understood as limiting myself to any particular form of packing. My packing consists of a mass of shredded or shaved particles of soft metal alloy, suitable for making packings of this character, such, for instance, as an alloy containing 90% lead, 6% tin, and 4% antimony, which I have found is a desirable metal for this purpose. A suitable quantity of these particles, 1, (Fig. 6) is placed in a mold, and compressed to any suitable shape, such as the rings, 2, shown in the drawings; the particles being felted together, thereby constituting an elastic yet integral whole.

If the form of packing shown in Figs. 1 and 2 is to be utilized, that is, a continuous ring packing, it must of course be slipped over the end of the rod or stem. In the form shown in Fig. 3, the gasket or ring has been divided into two sections, so that the sections thereof may be put in place over the rod or stem at any point thereof. In Figs. 4 and 5 is shown a split ring which may be opened to permit the same to be put over a rod or stem, the material of which the gasket is composed being prevented from being pulled apart as the limbs, $2^a$, of the stem are stretched apart, by dipping the said gasket, 2, in a suitable envelop or coating of elastic material, 3. Any elastic coating that will not injure the packing will answer for this purpose, but I have successfully used the following formula:— Melt together 10 lbs. of good glue, and 1 gal. of glycerin; then add 5 lbs. of sugar and one eighth pint of No. 1 litho varnish, and cook for forty-five minutes; into which resulting composition the packing rings or gaskets may be dipped, or the composition applied thereto as a coating with a brush. When the gasket or ring thus coated has been put in place upon a rod or piston, the elastic coating may be readily melted therefrom under a temperature of approximately 110 degrees F., and the metallic packing ring remains in place uninjured.

The coating composition, it will be remarked, does not penetrate the body of the gasket to any material extent, but is simply a surface coating or covering thereon, so that, while it permits the gasket to be bent and serves as a casing for the same in shipment, it will readily melt from the surface of the gasket and flow away when the gasket or ring is put into use.

When my packing is in place, while the felting of the particles, 1, permits the packing to be more or less elastic, yet no steam or air or other fluid under pressure can escape either through the packing or between the same and the rod or stem.

Having thus described my invention, I claim as new and desire to secure by Letters Patent:—

1. A packing comprising a mass of shaved or shredded soft metal felted together.

2. A packing ring or gasket comprising shaved or shredded soft metal particles felted together under pressure.

3. A split packing ring comprising a body of shredded or shaved soft metal felted together, and a coating of elastic material.

4. A split packing ring comprising a body of shredded or shaved soft metal felted together, and a coating of elastic material, which coating will melt at a temperature below that at which the metal body of the packing will melt.

In testimony whereof, I have hereunto affixed my signature.

MICHAEL COLLINS.

Witnesses:
A. V. GROUPE,
WALTER C. PUSEY.